US008327387B2

(12) United States Patent
Li et al.

(10) Patent No.: US 8,327,387 B2
(45) Date of Patent: Dec. 4, 2012

(54) METHOD FOR ACQUISITION OF GDI AND DIRECTX DATA

(75) Inventors: Hongwei Li, Beijing (CN); Chengkun Sun, Beijing (CN); Yiqiang Yan, Beijing (CN); Xiaohua Jiang, Beijing (CN); Shaoping Peng, Beijing (CN)

(73) Assignees: Legend Holdings Ltd., Beijing (CN); Lenovo (Beijing) Limited, Beijing (CN)

( * ) Notice: Subject to any disclaimer, the term of this patent is extended or adjusted under 35 U.S.C. 154(b) by 1189 days.

(21) Appl. No.: 11/966,610

(22) Filed: Dec. 28, 2007

(65) Prior Publication Data

US 2008/0163263 A1 Jul. 3, 2008

(30) Foreign Application Priority Data

Dec. 28, 2006 (CN) .......................... 2006 1 0169757

(51) Int. Cl.
*G06F 3/00* (2006.01)
*G06F 9/44* (2006.01)
*G06F 9/46* (2006.01)
*G06F 13/00* (2006.01)

(52) U.S. Cl. ......................... 719/322; 719/323; 719/327

(58) Field of Classification Search ........................ None
See application file for complete search history.

(56) References Cited

U.S. PATENT DOCUMENTS 6,677,964 B1 * 1/2004 Nason et al. .................. 715/764
2005/0114894 A1 * 5/2005 Hoerl .............................. 725/74

OTHER PUBLICATIONS

Brian Hook, An Incomplete Guide to Programming DirectDraw and Direct3D Immediate Mode (Release 0.22), Feb. 1, 2001 www.wksoftware.com, p. 1-24.*
Bipin Patwardhan, Direct3D Immediate Mode, Feb. 1, 2000. GameDev.net, p. 2.*

* cited by examiner

*Primary Examiner* — Andy Ho
*Assistant Examiner* — Craig Dorais
(74) *Attorney, Agent, or Firm* — Dickstein Shapiro LLP

(57) ABSTRACT

A method for acquiring graphics device interface data and DirectX data by use of a filter driver transparent to transparent to a graphics device interface engine, DirectX kernel and a real display driver is disclosed, the method comprises steps of: updating the graphics device interface, and acquiring the graphics device interface data by use of a corresponding graphics device interface function in the filter driver; acquiring, for DirectDraw in DirectX, DirectDraw application and video update data by intercepting frame switch and bit block transfer operations of DirectDraw part; acquiring, for Direct3D in DirectX, data of Direct3D application by intercepting the update interface of Direct3D part. With the method of present invention, an integral acquisition of Windows GDI and DirectX data can be achieved while DirectX function remains available.

6 Claims, 3 Drawing Sheets

METHOD FOR ACQUISITION OF GDI AND DIRECTX DATA

BACKGROUND OF THE INVENTION

1. Field of Invention

The present invention relates to the field of computer graphics and image processing, and in particular to a method for acquisition of Windows GDI and DirectX data while DirectX function remains available.

2. Description of Prior Art

After 3D and video processing has been adopted into the regular computational operations of a computer, there emerges such requirement that GDI data and DirectX data, such as 3D and video, are intercepted simultaneously in real time remote applications. The existing methods for acquiring data of a computer screen are listed as follows.

(1) The first method is to, in a user mode, hook each application present in a system by means of a hooker, filter any operation related to screen change and perform processing. Unfortunately, the large amount of data in the operations of a graphics system makes this method relatively inefficient and difficult in synchronous and rapid acquisition of graphics output. Also, synchronization is complicated due to the hook to each process. This method is employed in an early version of the remote tool like VNC.

(2) The second method is to utilize Mirror system defined in Windows and thus can acquire any synchronous change in an efficient way. This method, however, has a disadvantage in that DirectX application is automatically prohibited by the system, and thus no DirectX data can be acquired.

(3) The third method is to acquire DirectX data in such a manner that DirectX COM interface is intercepted in a user mode. But this method cannot process GDI data.

(4) The fourth method is to acquire GDI data by means of a filter driver. This method can maintain the availability of DirectX interface, and can also intercept completely GDI and DirectX data in cooperation with the third method. Although both GDI and DirectX data can be intercepted by combining the third and fourth methods, such an approach is troublesome to use. Furthermore, the third method functions on a complex DirectX COM interface, so it is difficult to determine the display memory intercepting performed directly through DirectX.

Therefore, a technique for acquisition of Windows GDI and DirectX data while DirectX function remains available is desired.

SUMMARY OF THE INVENTION

The present invention is made in view of the above problems. The object of the present invention is to provide a method for acquisition of Windows GDI and DirectX data while DirectX function remains available.

In one aspect of the present invention, a method for acquiring graphics device interface data and DirectX data by use of a filter driver transparent to a graphics device interface engine, DirectX kernel and a real display driver is provided comprising steps of: updating the graphics device interface, and acquiring the graphics device interface data by use of a corresponding graphics device interface function in the filter driver; acquiring, for DirectDraw in DirectX, DirectDraw application and video update data by intercepting frame switch and bit block transfer operations of DirectDraw part; acquiring, for Direct3D in DirectX, data of Direct3D application by intercepting the update interface of Direct3D part.

Preferably, the method further comprises loading a display filter driver in a static or dynamic manner before the above acquisition.

Preferably, DirectDraw part in DirectX is intercepted at a position before a display buffer and after decoding of data/a transformation buffer.

Preferably, Direct3D part in DirectX is intercepted at a position before a display buffer and after a transformation buffer.

Preferably, the interception of DirectDraw part in DirectX is implemented by intercepting update interfaces of Flip and Blit.

Preferably, the interception of Direct3D part in DirectX is implemented by intercepting update interfaces of DDFlip and DDBlit.

Preferably, the method further comprises storing in an update buffer area update of the graphics device interface, update of DirectDraw part in DirectX and update of Direct3D part in DirectX.

Preferably, lossless compression is performed on update of the graphics device interface, while lossy compression is performed on update of DirectDraw part in DirectX and update of Direct3D part in DirectX.

With the method of the present invention, a virtual graphics driver is defined. This display filter driver provides GDI and DirectX functions to a graphics system and intercepts any interface involved in local screen update. When the intercepted interface is invoked, based on whether local displaying is needed, a real driver is called to implement local update at first, and then the update is recorded in an update list for post processing. This scheme maintains DirectX function of a video card and enables DirectX application of the system to operate normally.

Moreover, GDI function is intercepted via interfaces like bit block transfer and bit block duplication, and DirectX is intercepted via interfaces like frame switch and frame render. Since local update of a graphics system is completed by use of these interfaces, GDI and DirectX updates can be intercepted at the same time after intercepting the two types of interfaces. Besides, all the intercepted interfaces are located in the same module, and thus it is possible to realize an integral interception and a simple processing. Additionally, the synchronization between GDI and DirectX parts is improved with high efficiency.

BRIEF DESCRIPTION OF THE DRAWINGS

The above features and advantages of the present invention will be more apparent from the following detailed description taken conjunction with the drawings in which.

DETAILED DESCRIPTION OF THE PREFERRED EMBODIMENTS

Hereafter, specific embodiments of the present invention will be elaborated with reference to the figures. In the following illustration, detail of some techniques known in the art will be omitted, otherwise such concrete description of well-known techniques will obscure the features and advantages of the present invention.

Figure 1:
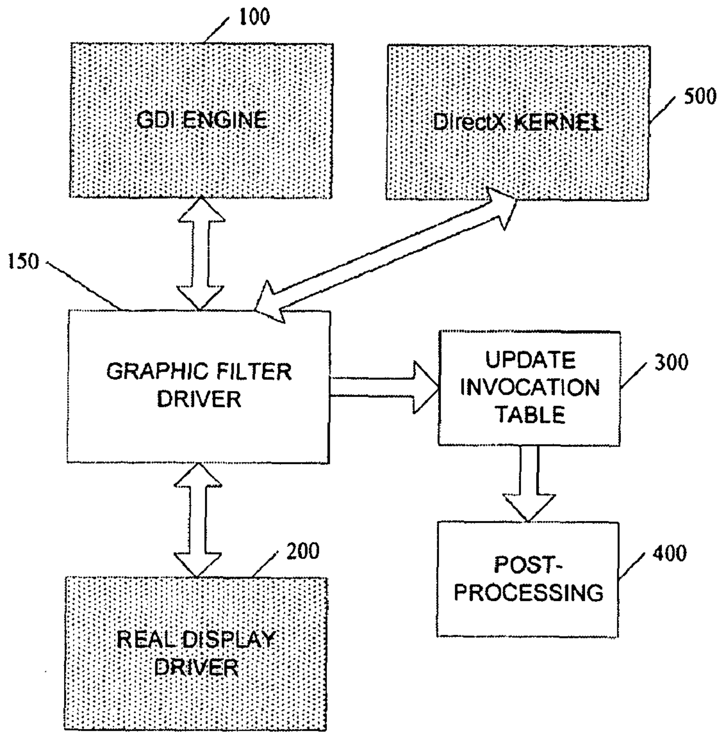
FIG. 1 shows a logical relationship between a display filter driver and a GDI engine, a real display driver and DirectX kernel utilized in the method according to an embodiment of the present invention.

FIG. 1 shows a logical relationship between a display filter driver 150 and a GDI engine 100, a real display driver 200 and DirectX kernel 500 utilized in the method according to an embodiment of the present invention.

As shown in FIG. 1, the embodiment of the present invention adds a filter layer, referred to as display filter driver 150, between GDI engine 100 and DirectX kernel 500 as well as real display driver 200. This filter driver functions two types of interfaces, i.e., display DDI and display DirectX, supported by the existing desktop display system. By installing display filter driver 150 and initializing the system, the filter layer behaves as real display driver 200 with respect to Windows GDI engine 100 and DirectX kernel 500, while behaves as Windows GDI engine 100 and DirectX kernel 500 with respect to real display driver 200. In other words, display filter driver 150 here is transparent for GDI engine 100 and DirectX kernel 500.

Figure 2:
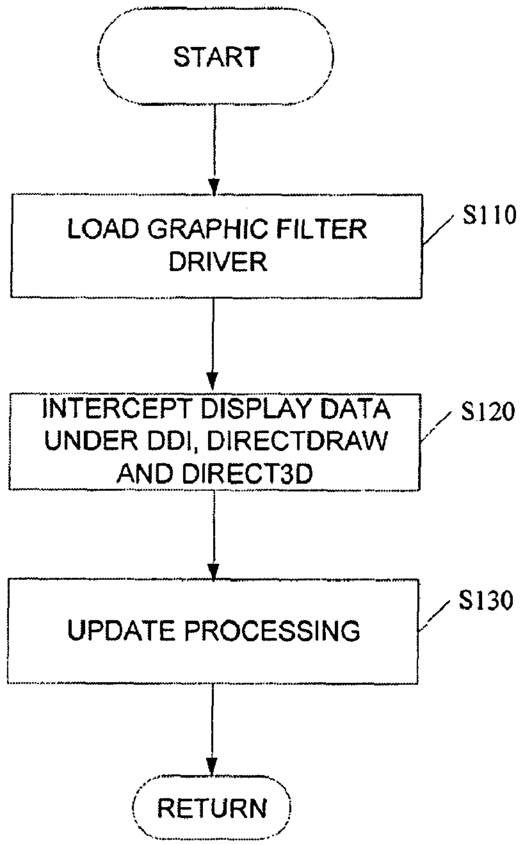
FIG. 2 shows an overall flowchart of the method of the present invention.

FIG. 2 shows an overall flowchart of the method of the present invention. As shown in FIG. 2, display filter driver 150 is first loaded (S110). Then, display data under DDI, DirectDraw and Direct3D are intercepted in a real time manner during the running of the operating system (S120), and update processing is carried out (S130).

At the time of installation, display filter driver 150 is set in the system configuration as the current driver for a physical video card, or a module-loading entry of the system is intercepted. During the runtime, if it is found that the loading module is the driver for a physical video card, display filter driver 150 is loaded at first, and then the system intercepts the interface of real driver after the loading of display filter driver 150. In particular, display filter driver 150 intercepts update of Windows GDI by use of corresponding DDI. For DirectDraw in DirectX, display filter driver 150 intercepts DirectDraw application and video update data by intercepting frame switch and bit block transfer operations of DirectDraw part of display driver core. For Direct3D in DirectX, display filter driver 150 intercepts the data of Direct3D application by intercepting such update interface as Present of Direct3D of display driver core.

During the process of configuring the system so that the system loads display filter driver 150 for the current video card, two methods, namely static and dynamic methods, can be used for the system configuration.

[Static Approach]

The installation program acquires PND DeviceID (i.e., plug-and-display device identification) of the master display device in the current system, enumerates and matches DeviceID of each register item under the video card register item {4d36e968-e325-11ce-bfc1-08002be10318}. For a matched register item, the register item of InstalledDisplayDrivers under its key of Settings is modified, and the value of the key is changed into the name of display filter driver 150. The operating system obtains the module name of the video card driver from the above name and loads the module into the system. In this way, display filter driver 150 is loaded to the system.

[Dynamic Approach]

The module-loading function of the system is intercepted. When it is found that the module being loaded is the video card driver, display filter driver 150 is loaded first, and then the video card driver is loaded by display filter driver 150.

Now, a description will be made to illustrate how display data under DDI, DirectDraw and Direct3D are intercepted.

After the system has loaded display filter driver 150, display filter driver 150 loads a real driver in a driver entry function DrvEnableDriver and makes one copy of DDI interface function table returned by the real driver. As for DDI function required for intercepting screen update, its value in the function table is modified to a pointer pointing to a corresponding function of the filter driver. Meanwhile, the original function pointer is saved. As such, display filter driver 150 completes the filter function on the invocation of real display driver 200.

Figure 3:
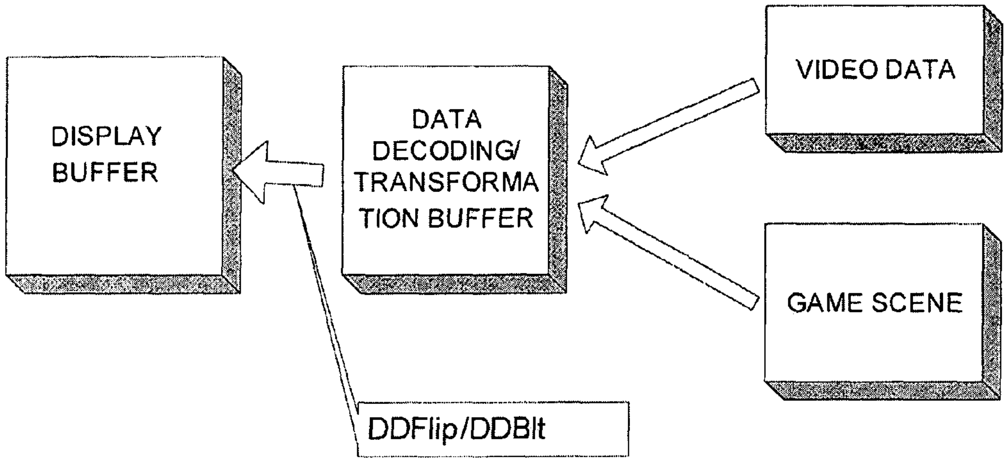
FIG. 3 shows a schematic diagram for explaining how to intercept display data in the case of DirectDraw.

FIG. 3 shows a schematic diagram for explaining how to intercept display data in the case of DirectDraw. As shown in FIG. 3, in the common processing for video and games, the interception point at which the method of the present invention initiates an act of interception is located before a display buffer and after decoding of data/a transformation buffer. The data in decoding of data/the transformation buffer are video data and/or game scenes.

For DirectDraw, the interception of display data is implemented by modifying the pointer of DirectDraw function table. DirectDraw is an extended set, since DrvEnableDirectDraw in DDI function table is extension of DirectDraw function. During invocation of DrvEnableDirectDraw, the pointers of call-back functions in the structures of DD_CALLBACKS, DD_SURFACECALLBACKS and DD_PALETTECALLBACKS are made to point to the functions provided in the present invention, so that invocation of the functions can be achieved at the corresponding interfaces of Surface creation, display and management, and invocation of the functions can also be obtained when palette change occurs. Specifically, two critical update interfaces to be intercepted are Flip and Blit, and the corresponding names of DDI interfaces are DDFlip and DDBlit.

In FIG. 3, video and game programs process contents to be displayed, such as decode the compressed video data, or compute next scene in a game, and place the generated date into a buffer. If the current game or video is of a full-screen mode, Flip function of DirectX will be called to update the screen data. On the other hand, Blit will be invoked for update if the game or video is in a window mode. The output processing of the two user programs will be eventually invoked into DDFlip and DDBlit interfaces provided by the display driver, and the filter driver can obtain such invocation at this moment. Display filter driver 150 records this update invocation in update invocation list 300 for post processing 400.

Figure 4:
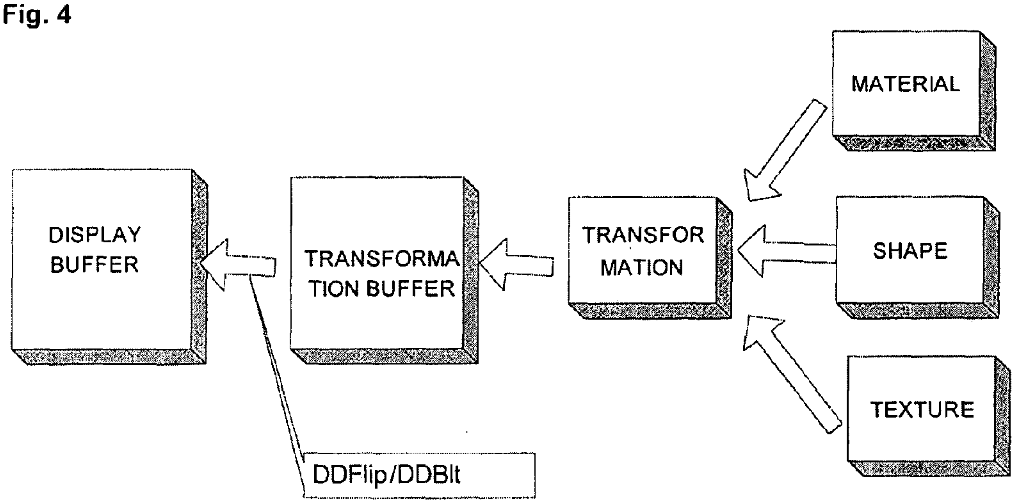
FIG. 4 shows a schematic diagram for explaining how to capture display data in the case of Direct3D.

FIG. 4 shows a schematic diagram for explaining how to capture display data in the case of Direct3D. The processing shown in FIG. 4 is similar to that of DirectDraw except that the complex processing on a 3D object, such as transforming material, shape and texture, will ultimately appears as an output buffer, namely a transformation buffer. In this case, the interception point of display data is located before the display buffer and after the transformation buffer. The interception of Direct3D can be achieved as long as DDFlip and DDBlit interfaces of DirectDraw can be intercepted.

The processing of Direct3D resembles the above description. Direct3D allows superposition of material and texture constituting a model of a 3D object, transformation of coordinates, position and the like as well as shadow processing. The result of these intricate operations eventually appears as a buffer area waiting for display. The difference from DirectX application interfaces (APIs) is that display of Present interface buffer area is used uniformly in Direct3D applications, while such Present interface does not exist in the real driver, and thus DDFlip and DDBlit are still used for outputting. Therefore, as long as DDFlip and DDBlit have been intercepted, Direct3D output can be intercepted without intercepting any other interface related to 3D model transformation.

When processing the update, the interception interface of display filter driver 150 is called first if a local screen is required. Different types of update processing and post processing are required for GDI and DirectX data since they are distinct from each other.

[Processing on GDI Update]

GDI data works in an accumulative update approach in which only changed part is updated, and thus the update mechanism for processing GDI is to record regions and operations which cause the change in GDI screen, backup source data required by operations and save these elements into an update list together. Since GDI has a small total amount of update, several changes can normally be saved continuously.

[Processing on DirectDraw and Direct3D Update]

The update of DirectDraw and Direct3D differs from GDI update in that the former is often the update of a full frame, that is, the entire data within a changed region will be updated completely, even though many parts in the region remain perfectly the same as those in the previous frame. This is because such an updated picture usually consists of multiple parts, and these parts need to be transformed and synthesized before being outputted to screen so as to implement certain special effects. Therefore, the data for the above application usually comprise a full-screen update of video or 3D game on the basis of frame. This kind of update is also saved in the update list 300. Only the latest one or several updates are saved due to the limits of system resource and bandwidth, and the previous update will be covered by subsequent if the processing cannot be conducted in time.

According to an embodiment, the saved GDI update and DirectX update are stored in the update list synchronously, and each of them is numbered in a time sequence. Lossless compression is performed on GDI update, while a rapid lossy compression is for DirectX update. In an example, the compressed data are transmitted to one or more remote terminals, and the mouse operation of the remote terminals is fed back so as to accomplish a remote projection or a remote control.

Figure 5:
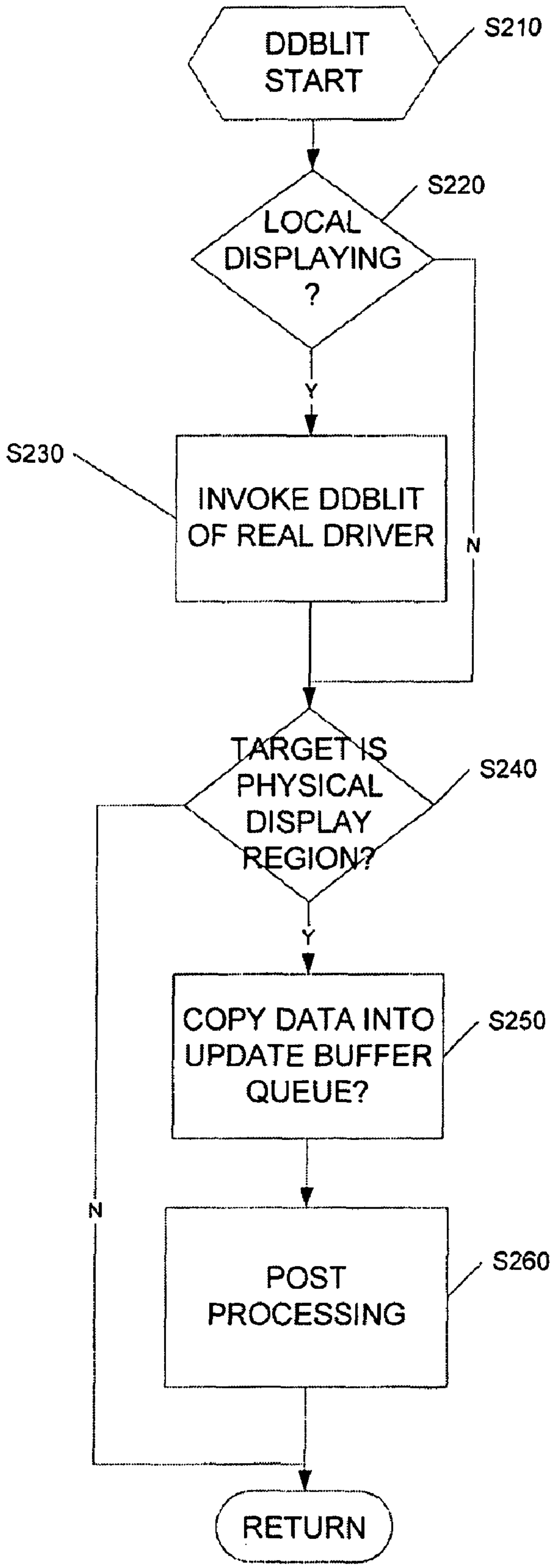
FIG. 5 shows a processing flowchart taking DDBlit as an example in the case of DDI.

FIG. 5 shows a processing flowchart taking DDBlit as an example in the case of DDI.

At first, DDBlit function is called (S210). Then, it is determined whether the operating mode needs local displaying (S220).

The update function of the real driver will be invoked if the current operating mode requires local displaying (S220: YES). Otherwise, the local displaying may not be necessary in some applications (S220: NO), the procedure of invoking DDBlit of the real driver is skipped.

Next, the target of the update buffer area 300 is determined as to whether it is a physical display region (S240). If it is not a physical display region (S240: NO), the current operation must be an intermediate step, and the flow returns. On the other hand, if the target is a physical display region (S240: YES), lattice data are copied into the update buffer area (S250) and recorded in the update list.

Finally, the obtained lattice data undergo post processing 400 (S260), which step can be executed synchronously with the invocation of DDBlit or in an asynchronous way as required.

The foregoing description is intended to only illustrate the embodiments of the present invention. Those skilled in the art will understand that any modification and partial substitution made within the scope of the present invention should be encompassed by the scope of the present invention in the claims. Thus, the scope of the present invention should be defined by the appended claims.

What is claimed is:

1. A computer-implemented method for acquiring graphics device interface data and immediate mode application programming interface data by use of a filter driver which is transparent for a graphics device interface engine, immediate mode application programming interface kernel and a real display driver, comprising steps performed by a computer:

updating the graphics device interface, and acquiring the graphics device interface data by use of a corresponding graphics device interface function in the filter driver, wherein, after the filter driver is loaded, the filter driver loads a real display driver in a driver entry function and makes one copy of device driver interface function table returned by the real display driver, and the value of the device driver interface function required for intercepting screen update is modified to a pointer pointing to a corresponding function of the filter driver and an original function filter is saved;

acquiring, for immediate mode video application programming interfaces, immediate mode video application and video update data by intercepting frame switch and bit block transfer operations of immediate mode video application programming interfaces;

acquiring, for immediate mode three-dimension (3D) application programming interfaces, data of immediate mode 3D application by intercepting the update interface of immediate mode 3D application programming interfaces; and storing an update buffer area update of the graphics device interface, update of immediate mode video application programming interfaces and update of immediate mode 3D application programming interfaces, wherein lossless compression is performed on the update of the graphics device interface, while lossy compression is performed on the update of immediate mode video application programming interfaces and the update of immediate mode 3D application programming interfaces.

2. The method of claim 1, further comprising:

loading a display filter driver in a static or dynamic manner before said acquisition.

3. The method of claim 1, wherein immediate mode video application programming interfaces are intercepted at a position before a display buffer and after a data decoding buffer or a transformation buffer.

4. The method of claim 1, wherein immediate mode 3D application programming interfaces are intercepted at a position before a display buffer and after a transformation buffer.

5. The method of claim 3, wherein said interception of immediate mode video application programming interfaces is implemented by intercepting update interfaces of Flip and Blit.

6. The method of claim 4, wherein said interception of immediate mode 3D application programming interfaces is implemented by intercepting update interfaces of DDFlip and DDBlit.

* * * * *